April 15, 1969     E. L. SMITH     3,438,216

CRYOGENIC RECOVERY VAPORIZER

Filed May 9, 1967

Ernest L. Smith
INVENTOR

BY
ATTORNEY

United States Patent Office 3,438,216
Patented Apr. 15, 1969

3,438,216
CRYOGENIC RECOVERY VAPORIZER
Ernest L. Smith, Shreveport, La., assignor to Texas Eastern Transmission Corporation, Shreveport, La., a corporation of Delaware
Filed May 9, 1967, Ser. No. 637,154
Int. Cl. F17c 9/02
U.S. Cl. 62—52         4 Claims

ABSTRACT OF THE DISCLOSURE

This patent discloses the combination of a natural gas vaporizer and a turbine in which the hot tail gas from the turbine is utilized to vaporize liquefied natural gas. The power from the turbine may be absorbed by a generator or like means.

---

This invention relates to a combined liquefied natural gas vaporizer and power generating means in which the two facilities are integrated.

Liquefied natural gas (hereinafter referred to as LNG) is normally vaporized by the addition of heat to return it to its natural gas state for use. For instance, natural gas may be liquefied and stored to provide gas for short periods of time during which power demands are excessively high. This stored liquefied natural gas is at a temperature of —258° F., and its temperature is increased by the addition of heat to vaporize it and return it to its normal form for use. A common form of vaporizer is a direct fired unit in which gas is burned to provide the necessary heat.

The conventional turbine of the type used to generate power consumes enormous quantities of air and has a very hot tail gas.

The horsepower output of the turbine may be increased by cooling the air fed to the turbine.

In one aspect of this invention, these two facilities are combined so that the cold LNG or cold vaporized LNG is used to cool the input air for the turbine.

In another aspect, this invention combines the LNG facility and the turbine facility by using the tail gases from the turbine to supply the heat for vaporizing LNG. While the output of the turbine might be used for any purpose, it is preferably used to drive a generator to generate electrical power which can be sold or used in the LNG facility.

An object of this invention is to provide a power facility in conjunction with an LNG vaporization facility to reduce the cost of operation of the facilities.

Another object is to provide a turbine-driven power facility with an LNG facility so that the cold LNG may be used to increase the power output of the turbine.

Another object is to combine a turbine-driven power facility with an LNG vaporization facility so that the tail gas of the turbine may be used as energy for vaporizing the LNG.

Other objects, features and advantages of the invention will be apparent from the drawings, the specification and the claims.

In the drawings, wherein like parts are identified by like numerals, and wherein several forms of this invention are illustrated:

Figure 1:
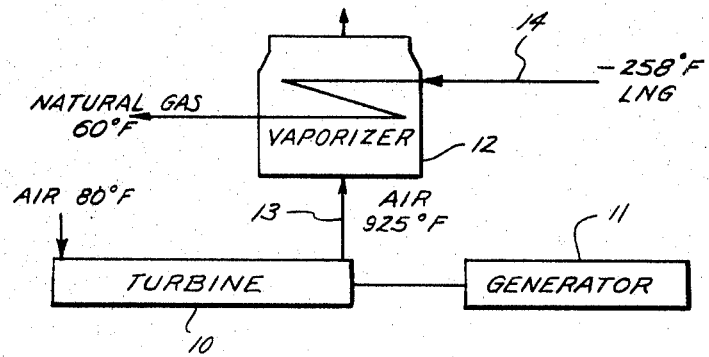
FIGURE 1 is a schematic diagram illustrating one form of this invention in which air at ambient temperature is fed to the turbine.

Referring first to FIGURE 1, the turbine 10 may be any desired turbine of the type that has a high-volume, high-temperature tail gas. For instance, in an LNG vaporization system for 100,000 mcfd., it is contemplated that an 18,500 HP General Electric turbine would be used. With 80° F. input air, the turbine tail gas may be at a temperature of about 925° F.

Any desired load could be placed on the turbine. Preferably the turbine drives a generator 11 which generates electric power. This power may be used in the LNG facility, or may be sold for out-plant consumption.

The LNG vaporizer 12 is connected to the tail gas outlet of turbine 10 through conduit 13. The vaporizer 12 may take any desired form in which the turbine tail gases may give up heat to the incoming LNG. In the illustrated system, LNG is withdrawn from storage and fed to the vaporizer 12 through line 14. The LNG will be at —258° F. and preferably its temperature is raised in vaporizer 12 to approximately 60° F.

In this form of the invention, the input air for the turbine is not cooled, but significant economics are obtained by utilizing the normally wasted tail gas from the turbine as the source of energy for vaporizing LNG.

Figure 2:
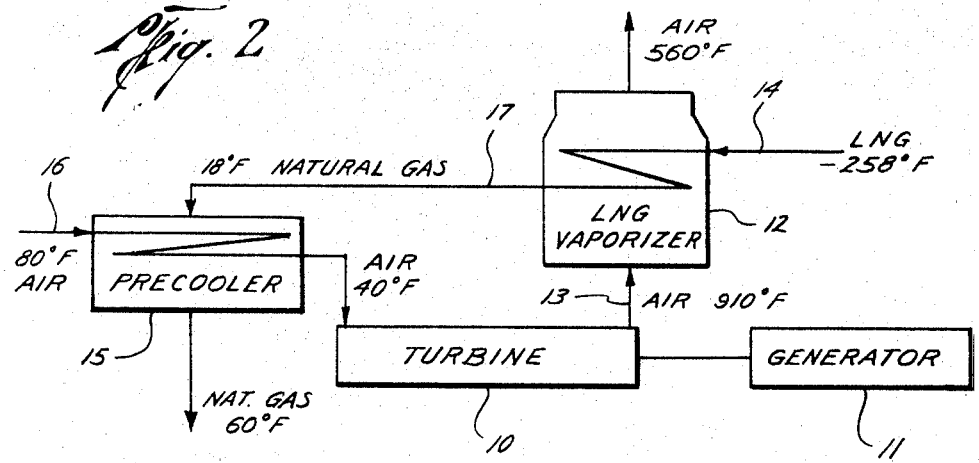
FIGURE 2 is a schematic diagram illustrating another form of this invention in which the turbine air is precooled by the cold vaporized LNG; and, FIGURE 3 is a schematic diagram illustrating another form of this invention in which the cold LNG precools the turbine air.

Referring now to FIGURE 2, the system illustrated is the same as the system of FIGURE 1 except that the vaporized LNG is used to precool the input air to the turbine. A precooler, or heat exchanger 15, of any desired form may be provided in which the turbine input air in conduit 16 is precooled by heat exchange with the natural gas in line 17 from the LNG vaporizer. In this system the tail gas may be at about 910° F. and the natural gas from the vaporizer 12 may be at about 18° F. This will cool the incoming 80° F. air to about 40° F. This system will result in the natural gas leaving the precooler 15 having a temperature of about 60° F. and the horsepower output of the turbine will be substantially increased. It is contemplated that the system of FIGURE 1 will have a kilowatt output of about 13,800 per hour, whereas the system of FIGURE 2 would generate about 16,100 kw./h.

Figure 3:
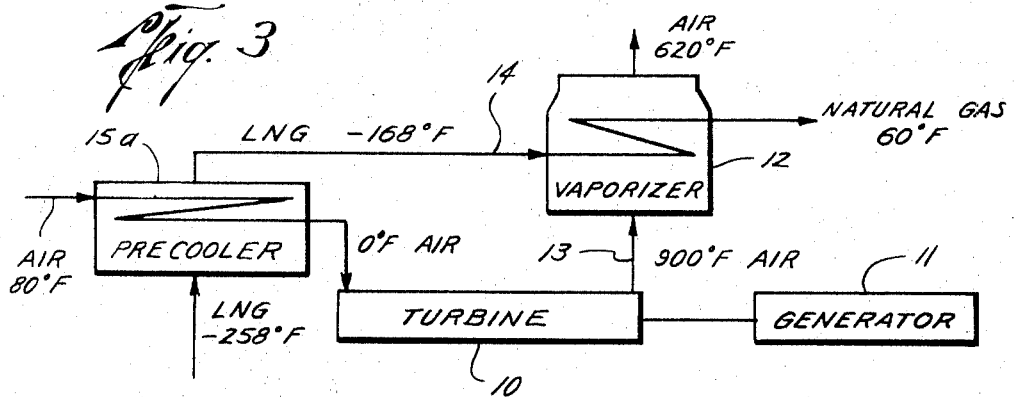

Referring to FIGURE 3, there is shown another form of this invention which is identical with FIGURE 1 except that the cold LNG is used to precool the turbine air. In this instance, the precooler 15a has passing therethrough the line 14 from LNG storage as well as the input air. The cold LNG may chill the input turbine air to about 0° F. and increase the temperature of the LNG to the vaporizer to about —168° F. This further precooled air as compared to FIGURES 1 and 2 will result in an increase horsepower output of turbine 10, and it is expected that generator 11 will generate about 18,580 kw./h.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A liquefied natural gas vaporizer system comprising,
   a turbine having a high volume-high temperature tail gas,
   means for absorbing the power generated by the turbine,
   a liquefied natural gas vaporizer connected to the tail gas outlet of the turbine and utilizing the hot tail gas to vaporize liquefied natural gas, and
   heat exchange means utilizing the cold fluid passing through the vaporizer to precool the input air of the turbine.

2. A liquefied natural gas vaporizer gas system comprising,
   a turbine having a high volume-high temperature tail gas, a generator driven by the turbine for generating electric power, a liquefied natural gas vaporizer connected to the tail gas outlet of the turbine and utilizing the hot tail gases to vaporize liquefied natural gas, and heat exchange means utilizing the cold fluid passing through the vaporizer to precool the input air of the turbine.

3. The system of claim 2 wherein the heat exchange means utilizes the liquefied natural gas to precool the input air for the turbine.

4. The system of claim 2 wherein the heat exchanger means utilizes the previously vaporized natural gas to precool the input air to the turbine.

References Cited

UNITED STATES PATENTS 3,237,413   3/1966   Taubert _____ 60—95
3,266,261   8/1966   Anderson _____ 62—52

LLOYD L. KING, *Primary Examiner.*

U.S. Cl. X.R.

60—95